April 13, 1926.
C. A. BODDIE
1,580,368
SPEED REGULATOR SYSTEM
Filed Nov. 12, 1920
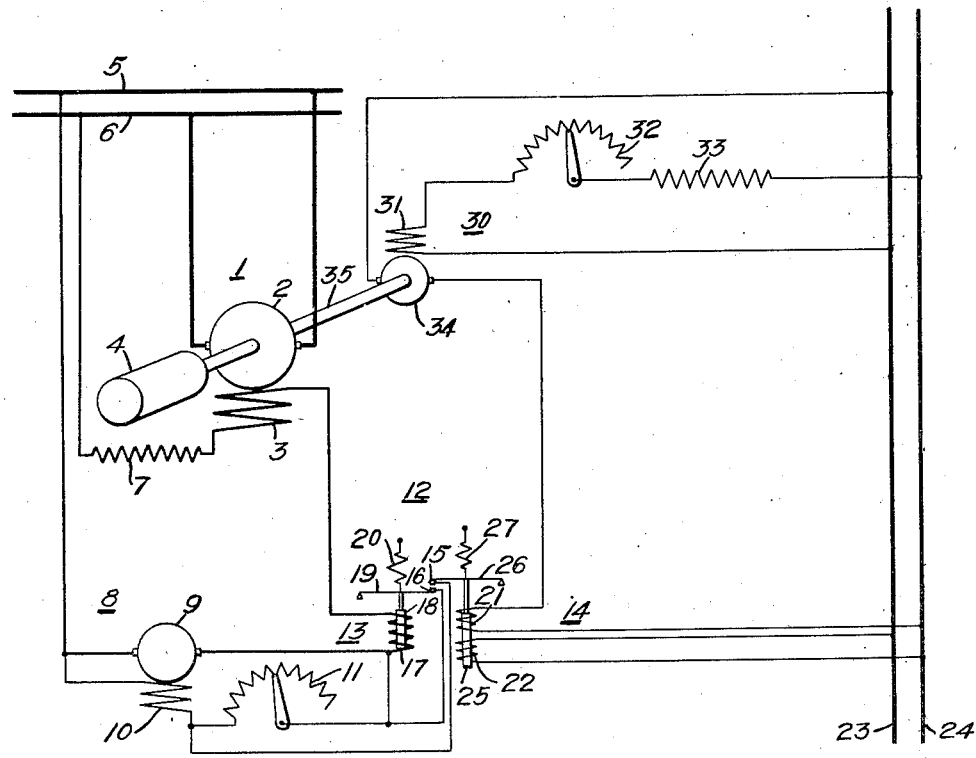
WITNESSES:
INVENTOR
Clarence A. Boddie
BY
ATTORNEY Patented Apr. 13, 1926.

1,580,368

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed November 12, 1920. Serial No. 423,546.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Speed-Regulator Systems, of which the following is a specification.

My invention relates to regulator systems and, particularly, to regulator systems for maintaining the speeds of rotating members substantially constant.

One object of my invention is to provide a speed-regulator system that shall comprise a main propelling motor and a main control element having an electromagnet basically excited from any suitable constant-potential source and additionally excited in accordance with the speed of the main motor for so governing the excitation of the main motor as to maintain its speed substantially constant.

In many industries, it is essential to operate many rotating members at substantially constant speeds, irrespective of the loads carried by them. Thus, in a steel-rolling mill, and, particularly, in a continuous mill for rolling ingots into billets, it is essential that the various sets of rolls shall operate at substantially constant speed to prevent buckling or stretching of the steel passing through the rolls.

In a system constructed in accordance with my invention, the excitation of each propelling motor is so governed as to maintain the speed of the motor substantially constant. In the preferred embodiment of my invention, a small direct-current generator is mechanically connected, in any suitable manner, to the main propelling motor in order to be operated in accordance with the speed of such motor. A main control element, preferably of the vibratory type, is provided for controlling an exciter generator which, in turn, is connected to the field-magnet winding of the main motor.

The main control element comprises a main magnet having a coil connected in series with the armature of said generator to a source of constant potential and a second coil which is directly connected to the source of constant potential. The field-magnet winding of the generator is also connected to the source of constant potential in order to maintain the excitation of the generator unchanged, irrespective of the load conditions on the main motor. The vibratory magnet of the main control element is preferably energized in series with the field-magnet winding of the main motor.

In a system, as above set forth, the armature of the small generator is connected, in a series with one coil of the main magnet, to a source of constant potential. Accordingly, it is apparent that the resistance of the generator armature may be so adjusted as to cause a large current flow through the coil of the main magnet for any variation in speed of the main motor.

The single figure of the accompanying drawing is a diagrammatic view of a regulator system constructed in accordance with my invention.

Referring to the accompanying drawing, a main motor 1, comprising an armature 2 and a field-magnet winding 3, is provided for operating a set of rolls, one only of which, 4, is shown on the drawing. The armature 2 of the motor is connected, through any suitable control apparatus (not shown), to a supply circuit comprising conductors 5 and 6. The field-magnet winding 3, is connected, through a suitable control resistor 7, to an exciter generator 8. The exciter generator 8 comprises an armature 9 and a field-magnet winding 10. A resistor 11, which is included in circuit with the field-magnet winding 10, is adapted to be intermittently short-circuited by means of a main control element 12. Preferably, the exciter circuit is connected across the supply circuit comprising conductors 5 and 6.

The main control element comprises a vibratory magnet 13, a main magnet 14, and a pair of main contact members 15 and 16. The vibratory magnet 13 comprises a coil 17, which is connected to the exciter generator 8 in series with the main-motor field-magnet winding 3. The core armature 18 of the vibratory magnet is connected to a contact arm 19, which carries the contact member 16. A spring member 20 is provided for supporting a portion of the weight of the core member 18 of the vibratory magnet 13.

The main magnet 14 comprises a coil 21, which is energized in accordance with the speed of the motor 1, and a second coil 22, which is directly connected to a source of constant potential, comprising conductors 23 and 24. The coils 21 and 22 operate a core armature 25, which is connected to a contact arm 26. The contact arm 26 carries the main contact member 15. A spring member 27 is provided for supporting a portion of the weight of the core armature 25. The coil 22 serves to basically excite the main magnet, and the coil 21 serves to additionally excite such magnet in accordance with the speed of the main motor 1.

A small generator 30, of any suitable type, is provided for energizing the coil 21 in accordance with the speed of the main motor 1. The generator comprises a field-magnet winding 31, which is connected in circuit with resistors 32 and 33 to the supply conductors 23 and 24, and an armature 34, which is connected in series with the coil 21, across the supply conductors 23 and 24. The generator is mechanically connected to the main motor 1 in any suitable manner and, preferably, the armature 34 is directly mounted on the armature shaft 35 of the main motor.

The excitation of the generator 30 is maintained substantially constant by reason of the field-magnet winding 31 being connected to a source of constant potential. Moreover, the magnet 14 is polarized by reason of the coil 22 being connected to the supply conductors 23 and 24. The magnetic relation of the coils 22 and 21 may be varied, as desired, to conform to various operating conditions. Moreover, the resistance of the generator armature 34 may be varied in accordance with the current flow it is desired to effect through the coil 21. In such system, the armature 34 is connected in parallel with the constant-potential source and, accordingly, any variation in speed of the generator will cause a substantial change in the current flow through the generator and, accordingly, through the coil 21 of the main magnet 14.

Assuming the speed of the main motor 1 to fall below normal value, the speed of the generator 30 is reduced and, accordingly, the voltage induced by such generator is lowered. It may also be assumed that the voltage produced by the generator 30, under normal speed conditions, is substantially equal to the potential obtaining across the supply conductors 23 and 24. Consequently, current flows through the armature 34 from the supply conductors 23 and 24 to so energize the coil 21 of the main magnet 14 as to move the main contact member 15 further away from the main contact member 16. Accordingly, the main contact members 16 and 15 increase the period of time during each cycle that the resistor 11 is included in circuit with the field-magnet winding 10 of the exciter generator 8. Consequently, the excitation of the field-magnet winding 3 is reduced to increase the speed of the main motor 1.

As the main control element 12 is of the well-known vibratory type, a detailed description thereof is deemed unnecessary. The vibratory magnet 13, being connected in the field-magnet-winding circuit of the main motor, receives a variable excitation for vibrating the contact member 16. The position of the contact member 15 is varied in accordance with the speed of the main motor for varying the period of time during each cycle of the main control element that the resistor 11 is short-circuited.

In the system above described, it should be noted that the generator 30 is operated directly in accordance with the speed of the main motor 1, and any change in the speed of such generator causes a magnified change in the excitation of the main magnet 14. The main control element, in the manner heretofore set forth, will change the excitation of the main magnet to correct any speed change.

That is to say, the resistance of the armature 34 is a constant and, by maintaining the resistance low, a variation in the voltage generated by the armature will produce a large change in the current in the coil 21 of the control electromagnet, the equation being $$I = \frac{E_1 - E}{R}$$

where I is the current in the coil 21; $E_1$ is the voltage of the bus bars 23 and 24; E is the voltage of the machine 30; and R is the resistance of the armature 34.

Modifications in the system and in the arrangement and location of parts may be made within the spirit and scope of my invention, and such modifications are intended to be covered by the appended claims.

I claim as my invention:—

1. In a speed-regulator system, the combination with a rotating member, a generator operated in accordance with the speed of said member and having an armature and a field-magnet winding, and a constant-potential source connected to said armature and to said field-magnet winding, of means comprising an electromagnet having two energizing coils for controlling the speed of said rotating member, one of said coils being connected directly to said source and the other coil being connected in series with said armature.

2. In a speed-regulator system, the combination with a motor, and a generator operated by said motor and having an armature and a field-magnet winding, of means comprising a magnet having two coils for controlling the excitation of said motor, one of said coils being connected directly to said source and the other coil being connected in circuit with said armature.

3. In a speed-regulator system, the combination with a motor, a generator operated by said motor and having a constant excitation, and a source of constant potential connected to the armature of said generator, of means comprising a magnet having two coils for so controlling the excitation of the motor as to maintain its speed substantially constant, one of said coils being connected directly to said source and the other coil being connected in circuit with the armature of said generator.

4. In a speed-regulator system, the combination with a motor and a generator operated in accordance with the speed of the motor, of means comprising a magnet having two coils for controlling the motor excitation, and means for energizing one of said coils to basically energize said magnet, the other coil being energized by said generator.

5. In a speed-regulator system, the combination with a motor having an armature and a field-magnet winding, a source of constant potential, and a generator operated in accordance with the speed of said motor, the field-magnet winding of said generator being directly connected to said source, of an exciter generator connected to the field-magnet winding of said motor, and a main control element comprising vibratory and main magnets for governing the excitation of said exciter generator, said vibratory magnet being connected in circuit with the motor field-magnet winding, and said main magnet comprising a coil directly connected to said source and a second coil connected in series with the generator armature to said source.

6. In a speed-regulator system, the combination with a dynamo-electric machine, a generator operated thereby and an independent source of electromotive force, of means for governing the excitation of said machine, said means comprising a polarized eletromagnet receiving an energization from said source and said generator connected in series-circuit relation.

7. In a speed-regulator system, the combination with a dynamo-electric machine, a generator operated thereby and an independent source of electromotive force, of means for governing the excitation of said machine, said means comprising a plurality of contact members and a plurality of electromagnets for controlling said contact members, one of said electro-magnets being energized from the excitation circuit of said machine and the other of said electromagnets being polarized and also receiving an energization from said generator and said independent source connected in series-circuit relation.

In testimony whereof, I have hereunto subscribed by name this first day of November 1920.

CLARENCE A. BODDIE.